US007725502B1

(12) United States Patent  (10) Patent No.: US 7,725,502 B1
Badros et al.  (45) Date of Patent: May 25, 2010

(54) TIME-MULTIPLEXING DOCUMENTS BASED ON PREFERENCES OR RELATEDNESS

(75) Inventors: Gregory Joseph Badros, Palo Alto, CA (US); Jeff Eddings, San Ramon, CA (US); Rama Ranganath, San Francisco, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 11/152,781

(22) Filed: Jun. 15, 2005

(51) Int. Cl.
*G06F 17/30* (2006.01)
(52) U.S. Cl. .............................. 707/807; 707/999.104; 707/999.101; 705/14; 705/26; 705/59; 709/225; 709/219; 709/203
(58) Field of Classification Search .................. 705/14, 705/26, 59; 707/101, 102, 104.1; 709/225, 709/219, 203
See application file for complete search history.

(56) References Cited

U.S. PATENT DOCUMENTS

| | | | |
|---|---|---|---|
| 5,636,346 A | 6/1997 | Saxe | |
| 5,724,521 A | 3/1998 | Dedrick et al. | |
| 5,740,549 A | 4/1998 | Reilly et al. | |
| 5,794,210 A | 8/1998 | Goldhaber et al. | |
| 5,845,265 A | 12/1998 | Woolston | |
| 5,848,397 A | 12/1998 | Marsh et al. | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,948,061 A | 9/1999 | Merriman | |
| 5,974,398 A | 10/1999 | Hanson et al. | |
| 6,006,197 A | 12/1999 | d'Eon et al. | |
| 6,026,368 A | 2/2000 | Brown et al. | |
| 6,044,375 A | 3/2000 | Shmueli et al. | |
| 6,044,376 A | 3/2000 | Kurtzman, II | |
| 6,061,659 A | 5/2000 | Murray | |
| 6,067,570 A | 5/2000 | Kreynin et al. | |
| 6,078,866 A | 6/2000 | Buck et al. | |
| 6,078,914 A | 6/2000 | Redfern | |
| 6,144,944 A | 11/2000 | Kurtzman, II et al. | |
| 6,167,382 A | 12/2000 | Sparks et al. | |

(Continued)

FOREIGN PATENT DOCUMENTS

EP  1026610 A2  8/2000

(Continued)

OTHER PUBLICATIONS

Chris Sherman, "Google Launches AdWords Select," Feb. 20, 2002, 6 pages.

(Continued)

*Primary Examiner*—Isaac M Woo
*Assistant Examiner*—Syling Yen
(74) *Attorney, Agent, or Firm*—Fish & Richardson PC

(57) ABSTRACT

A system and method for time-multiplexing the display of a plurality of electronic documents are provided. Time-multiplexing criteria for displaying a plurality of selected documents associated with a concept on a time-multiplexed basis is determined. The plurality of selected documents are caused to be displayed at an output device in a predetermined sequence according to the time-multiplexing criteria. The time-multiplexing criteria may be a variety of criteria related to the selected documents, the source of the selected documents, or other factors such as a relevance to a concept and one or more preferences associated with the selected documents.

27 Claims, 6 Drawing Sheets

U.S. PATENT DOCUMENTS

| | | | |
|---|---|---|---|
| 6,223,163 | B1 | 4/2001 | Van Luchene |
| 6,230,170 | B1 | 5/2001 | Zellweger et al. |
| 6,247,009 | B1 | 6/2001 | Shiiyama et al. |
| 6,253,189 | B1 | 6/2001 | Feezell et al. |
| 6,269,361 | B1 | 7/2001 | Davis et al. |
| 6,285,987 | B1 | 9/2001 | Roth et al. |
| 6,298,348 | B1 | 10/2001 | Eldering |
| 6,324,519 | B1 | 11/2001 | Eldering |
| 6,336,132 | B2 | 1/2002 | Appleman et al. |
| 6,401,075 | B1 | 6/2002 | Mason et al. |
| 6,421,675 | B1 | 7/2002 | Ryan et al. |
| 6,698,020 | B1 * | 2/2004 | Zigmond et al. ............ 725/34 |
| 6,826,594 | B1 * | 11/2004 | Pettersen ................... 709/203 |
| 6,985,882 | B1 | 1/2006 | Del Sesto |
| 7,039,599 | B2 | 5/2006 | Merriman |
| 7,136,875 | B2 | 11/2006 | Anderson et al. |
| 2001/0042064 | A1 | 11/2001 | Davis et al. |
| 2001/0047297 | A1 * | 11/2001 | Wen ............................. 705/14 |
| 2001/0051911 | A1 * | 12/2001 | Marks et al. .................. 705/37 |
| 2002/0002509 | A1 | 1/2002 | Wagorn et al. |
| 2002/0002525 | A1 | 1/2002 | Arai et al. |
| 2002/0026359 | A1 | 2/2002 | Long et al. |
| 2002/0035507 | A1 | 3/2002 | Singh |
| 2002/0035536 | A1 | 3/2002 | Gellman |
| 2002/0038282 | A1 * | 3/2002 | Montgomery ................ 705/37 |
| 2002/0046099 | A1 | 4/2002 | Frengut et al. |
| 2002/0046104 | A1 | 4/2002 | Kaddeche et al. |
| 2002/0077891 | A1 | 6/2002 | Castle et al. |
| 2002/0099605 | A1 | 7/2002 | Weitzman et al. |
| 2002/0111898 | A1 * | 8/2002 | Numaoka et al. ............. 705/37 |
| 2002/0123988 | A1 | 9/2002 | Dean et al. |
| 2002/0165773 | A1 | 11/2002 | Natsuno et al. |
| 2002/0184097 | A1 | 12/2002 | Hijiri et al. |
| 2002/0194062 | A1 * | 12/2002 | Linde ........................... 705/14 |
| 2002/0198780 | A1 | 12/2002 | Kawakami et al. |
| 2003/0037334 | A1 | 2/2003 | Khoo et al. |
| 2003/0046152 | A1 * | 3/2003 | Colas et al. ................... 705/14 |
| 2003/0070167 | A1 * | 4/2003 | Holtz et al. ................... 725/32 |
| 2003/0083937 | A1 | 5/2003 | Hasegawa et al. |
| 2003/0149618 | A1 | 8/2003 | Sender et al. |
| 2003/0163372 | A1 | 8/2003 | Kolsy |
| 2003/0171990 | A1 * | 9/2003 | Rao et al. ..................... 705/14 |
| 2003/0216963 | A1 | 11/2003 | Ishiwaka et al. |
| 2003/0221191 | A1 * | 11/2003 | Khusheim .................... 725/35 |
| 2004/0015397 | A1 | 1/2004 | Barry et al. |
| 2004/0019523 | A1 | 1/2004 | Barry et al. |
| 2004/0044571 | A1 | 3/2004 | Bronnimann et al. |
| 2004/0054577 | A1 | 3/2004 | Inoue et al. |
| 2004/0054589 | A1 | 3/2004 | Nicholas et al. |
| 2004/0059708 | A1 | 3/2004 | Dean et al. |
| 2004/0059712 | A1 | 3/2004 | Dean et al. |
| 2004/0093327 | A1 | 5/2004 | Anderson et al. |
| 2004/0093620 | A1 | 5/2004 | Iino et al. |
| 2004/0119740 | A1 | 6/2004 | Chang et al. |
| 2004/0143499 | A1 | 7/2004 | Dietsch et al. |
| 2004/0143843 | A1 | 7/2004 | Khoo et al. |
| 2004/0167928 | A1 | 8/2004 | Anderson et al. |
| 2004/0249709 | A1 | 12/2004 | Donovan et al. |
| 2005/0033641 | A1 | 2/2005 | Jha et al. |
| 2005/0065806 | A1 | 3/2005 | Harik |
| 2005/0071224 | A1 | 3/2005 | Fikes et al. |
| 2005/0096979 | A1 | 5/2005 | Koningstein |
| 2005/0096980 | A1 * | 5/2005 | Koningstein ................. 705/14 |
| 2005/0131758 | A1 | 6/2005 | Desikan et al. |
| 2005/0131762 | A1 | 6/2005 | Bharat et al. |
| 2005/0144069 | A1 | 6/2005 | Wiseman et al. |
| 2005/0216335 | A1 | 9/2005 | Fikes et al. |
| 2005/0222900 | A1 | 10/2005 | Fuloria et al. |
| 2005/0222903 | A1 | 10/2005 | Buchheit et al. |
| 2005/0222989 | A1 | 10/2005 | Haveliwala et al. |
| 2005/0223002 | A1 | 10/2005 | Agarwal et al. |
| 2006/0149623 | A1 | 7/2006 | Bardros et al. |

FOREIGN PATENT DOCUMENTS

| | | |
|---|---|---|
| WO | WO 97/21183 | 6/1997 |
| WO | WO 0038074 | 6/2000 |
| WO | WO 2004/042525 | 5/2004 |

OTHER PUBLICATIONS

Google Introduces New Pricing For Popular Self-Service Online Advertising Program, http://www.google.com/press/pressrel/select.html, p. 1-2, dated Feb. 20, 2002, printed on Jul. 29, 2003.

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

U.S. Appl. No. 95/001,073, Reexamination of Stone et al.

U.S. Appl. No. 95/001,061, Reexamination of Stone et al.

U.S. Appl. No. 95/001,069, Reexamination of Stone et al.

U.S. Appl. No. 95/001,068, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

* cited by examiner

TIME-MULTIPLEXING DOCUMENTS BASED ON PREFERENCES OR RELATEDNESS

FIELD OF THE INVENTION

The present inventions relate to displaying a plurality of documents on a time-multiplexed basis according to specific criteria, such as a preference or relatedness.

BACKGROUND OF THE INVENTION

Advertisers and other providers of content on the Internet compete for a user's attention on a webpage. While users typically select and view a webpage for its primary content such as a text-based news article located in central area of the page, the remaining real estate of a webpage offers advertisers and other content providers an opportunity to display advertisements and other content to a user. However, to avoid cluttering a webpage with numerous advertisements that might annoy users, website providers typically limit the number of advertisements on a single page as well as the amount of space on the page that may be occupied by advertisements and other unsolicited content. For instance, a single banner ad may scroll across the top of a typical webpage while two or three narrower block advertisements, links, and other content may be displayed unobtrusively on the far left or right sides of the page.

Larger ad spaces at the top of a page typically command a higher price from advertisers due to their increased likelihood of attracting the user's attention and communicating an advertiser's message. Content providers have begun providing multiple advertisements at the top of a page (and in other discrete locations) in a time-multiplexed fashion. Just as a rotating billboard can rotate continually between two or more advertisements, a single ad space of a webpage can rotate between multiple ads. For instance, a single banner ad on one page may rotate every five seconds between an ad for a razor and an ad for a new soft drink. In some cases a single ad space may earn more revenue from two advertisers who time-share the space than it would from a single advertiser who does not time-share the space.

However, traditional systems rotate such time-multiplexed advertisements in a random or otherwise arbitrary order and provide equal time for each ad.

These and other drawbacks exist with current systems and methods.

SUMMARY OF THE INVENTION

Accordingly, various embodiments of the present inventions may be directed to a system and method for time-multiplexing the display of a plurality of electronic documents. Time-multiplexing criteria for displaying a plurality of selected documents associated with a concept on a time-multiplexed basis is determined. The plurality of selected documents are caused to be displayed at an output device in a predetermined sequence according to the time-multiplexing criteria. The time-multiplexing criteria may be a variety of criteria related to the selected documents, the source of the selected documents, or other factors such as the selected documents' relevance to a concept and one or more preferences associated with the selected documents.

According to another embodiment, a system for time-multiplexing the display of a plurality of electronic documents is provided. A processor determines time-multiplexing criteria for displaying a plurality of selected documents associated with a concept on a time-multiplexed basis. An output module causes the display of the plurality of selected documents at an output device in a predetermined sequence according to the time-multiplexing criteria.

According to another embodiment, a method for providing a plurality of electronic documents in a composite document is provided. Two or more advertisements are received. One or more bids and preferences associated with the advertisements are received. Each of the advertisements is associated with one or more keywords. A request for a document related to a concept is received. A plurality of advertisements are received from the two or more advertisements based on a relevance of each of the plurality of advertisements to the concept. Time-multiplexing criteria for displaying the plurality of selected advertisements on a time-multiplexed basis in a webpage is determined. The time-multiplexing criteria are determined based on (i) a relevance to the concept and/or (ii) a bid, a cost per click, and/or a click through rate associated with each selected advertisement. In response to the request, the plurality of selected advertisements are caused to be displayed in a predetermined sequence according to the time-multiplexing criteria in a webpage at a user display device.

Other embodiments may be considered.

DETAILED DESCRIPTION OF EXEMPLARY EMBODIMENT(S)

Figure 1:
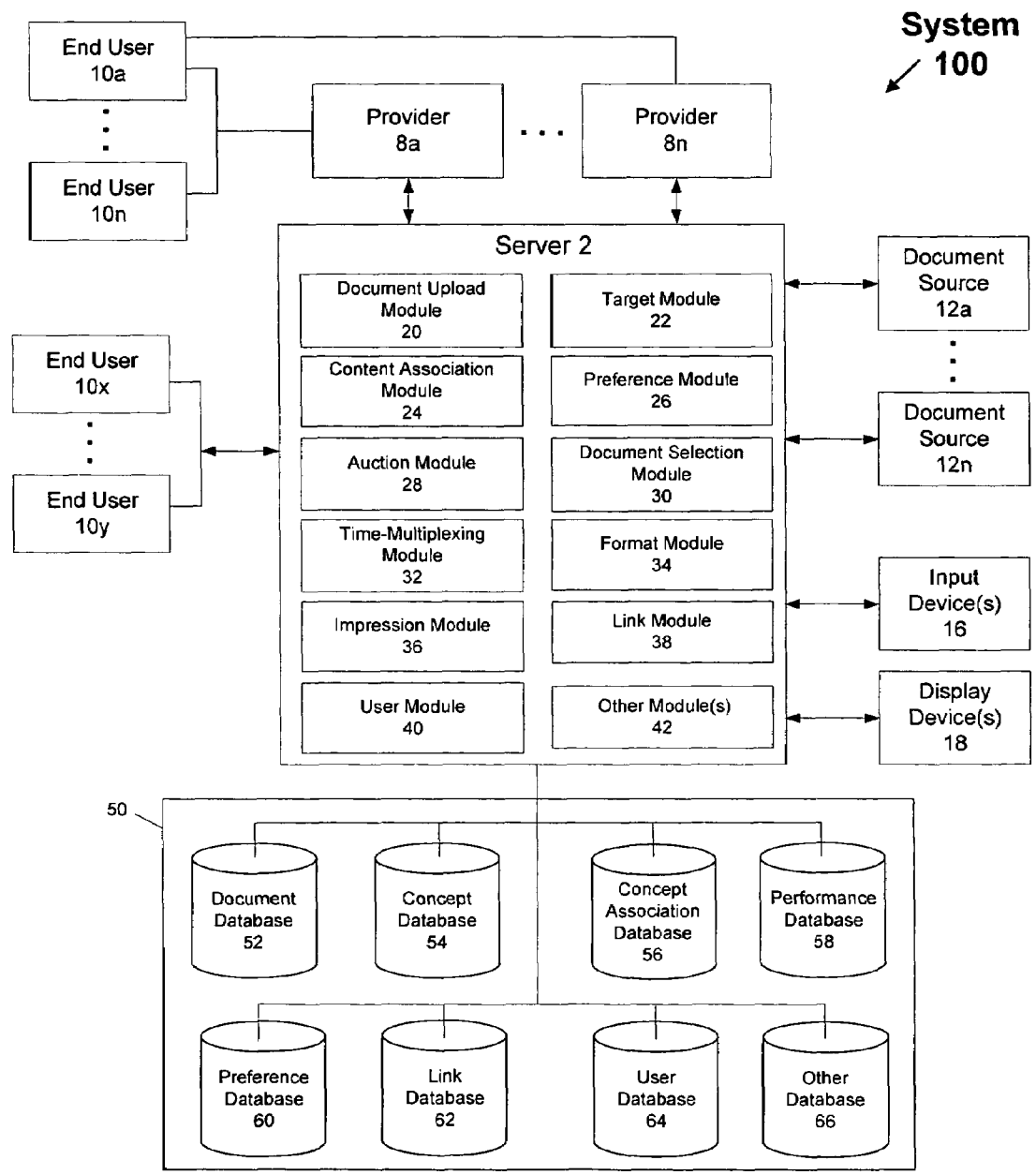
FIG. 1 depicts a system for time-multiplexing the display of a plurality of electronic documents according to an embodiment of the invention.

Some embodiments of the present invention provide a system and method for providing documents such as advertisements on a time-multiplexed basis. The manner of time-multiplexing may be based on various criteria. For instance, the sequence and duration of display for each document may be based on the document's relatedness to a particular concept or an associated preference of a document provider. The documents may be displayed at a display source such as a monitor or electronic billboard, and the documents may be displayed in connection with the display of another document such as a webpage.

For instance, a user may request a document such as a webpage associated with a search query or other concept. The system may select a plurality of documents such as advertisements associated with the concept. The system may then determine time-multiplexing criteria and cause the selected documents to be displayed according to be displayed on a time-multiplexed basis according to the time-multiplexing criteria. For instance, if a user requests a webpage related to water skiing, the system may send the user a webpage related to water skiing that displays a plurality of time-multiplexed water skiing-related ads within a single ad space on the webpage.

The manner of time-multiplexing the documents may be based on various criteria, such as a relatedness to the concept and/or one or more preferences of a document source associated with the document. For instance, the order and duration of each ad may be determined by the relevance of each ad to the concept. The manner of time-multiplexing may also be based on advertiser preferences, such as a preference displaying ads with a particular concept or for having an advertisement displayed first or for a specific duration. Advertisers and other document sources may express their preferences in a bid on keyword concepts or by otherwise expressing preferences related to various criteria that govern the display of their associated documents. For instance, advertisers may express a minimum (and maximum) time duration for a video ad to ensure that the ad is not rotated before the end of the video (or so that the ad switches shortly after the end of the video).

One advantage of time-multiplexing the display of documents is that more than one document can be output to users. In embodiments related to webpage advertisements, more than one advertisement may be displayed in a single ad space of a single webpage.

In the case of advertisements, more advertising revenue may be generated for multiple ads sharing a single space than would be generated by displaying a single ad in the same space. For revenue models based on "impressions" (an instance of an advertisement being displayed to a user) or other ad publication, a greater number of impressions in a given space increases revenue. For revenue models based on a "click through" (e.g., the number of times a user actually selects an ad, e.g., by clicking on it in a webpage) or a "click through rate" (number of ad selections divided by total number of ad impressions), increasing the number of ads displayed to a user increases the likelihood that a user will see an ad of interest and select it.

Another advantage is that advertisers can avoid spending money on less valuable marginal ad time. After a user is exposed to an ad for a certain amount of time, the user's likelihood of selecting the ad decreases. For instance, when a user has not selected an ad after thirty seconds of exposure to the ad, the user typically will not select the ad at all. Ads therefore have a diminishing marginal utility to an advertiser as time exposure increases. Thus, for exposure-based revenue models, time-multiplexing of multiple ads enables advertisers to gain a substantial proportion of the benefit of ad exposure for a lower cost.

In some embodiments, larger time-multiplexed banner ads may be more price-competitive with other ad types, such as smaller space-multiplexed ads. In other words, the price of a larger and more prominent ad for less time may be lower (or at least closer in price) to a smaller and less-prominent ad for a longer time. Accordingly, larger and more prominent ad types may become more available to budget-minded advertisers who could otherwise afford only smaller ads.

Another advantage of time-multiplexing ads is that the dynamic feature of rotating ads can better attract users' attention. This advantage is particularly helpful for text ads, which are typically less attractive to users due to their simple and static nature as compared to image-based ads which can provide vibrant and dynamic colors without requiring users to read. Time-multiplexing text ads makes them significantly more eye-catching to viewers than a single text ad. In some embodiments, text-ads may be preferable to image or video ads (or other non-text ads) because they are easier to review and approve (e.g., by using a computer to screen for inappropriate word content) than sound-based or image-based ads. Text ads may also be preferred because they are less intrusive upon a user's attention.

One disadvantage of time-multiplexing is that an interested user may miss the opportunity to select an ad once the next ad is displayed. This issue can be mitigated if the ads cycle through a rotation, thereby allowing the user to select the ad when the ad (or another ad from the same advertiser or company) is displayed again in the next rotation.

Accordingly, various embodiments of the present inventions may be directed to a system and a method for time-multiplexing the display of a plurality of electronic documents.

As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content. Although an advertisement is often used herein as an exemplary document, it should be understood that any document may be used.

In some embodiments the document may be an advertisement. An advertisement may comprise audio and/or video signals, static and/or dynamic images, graphics, video, film, or other content that relate to one or more products, services, and/or entities, such as commercial entities. Ads may comprise various visual features, including animation, sound, etc., and may also include text, such as in a text advertisement. Ads may also comprise any other promotional content or object, such as printed flyers (e.g., with maps to locations of advertising businesses), printed coupons, trinkets, gimmicks, clothing (e.g., T-shirts printed with a promotional message), candy, food, samples (e.g., product samples), and other items. Thus, the term "advertisement" is used herein in its broadest sense to mean any content or object intended for observation, use, or consumption by one or more persons for the purpose of marketing or promoting a product or service.

Electronic documents such as ads can include an embedded hypertext link.

Website-based advertisements are often presented to their advertising audience in the form of "banner ads"—i.e., a rectangular box across the top of a web page that includes a graphic. Oftentimes, the graphic is animated to attract the audience's attention. When a member of the advertising audience selects one of these banner ads by clicking on it, one or more embedded hypertext links typically direct the viewer to the advertiser's website. This process, wherein the viewer selects an advertisement, is commonly referred to as a "click through," and may be used to refer to any type of user selection. The ratio of the number of click throughs to the number of impressions of a particular advertisement (i.e., the number of times an advertisement is displayed) is commonly referred to as the click through rate of the advertisement. It is an object of the invention to increase the "page click through rate," or the rate at which users select an advertisement on a page. Various embodiments of the invention may achieve this goal by increasing the number of different ads displayed on a page—and thereby increasing the likelihood that any one of the ads may be of interest to a user.

While ads and websites are used for exemplary purposes, it should be understood that embodiments of the invention may be directed to other electronic documents. For instance, various embodiments of the invention contemplate documents such as content pages, search results, emails, applications, IM messages, audio content or files, video content or files (e.g., television programming), Flash objects and files, animated GIF files or other image files, other files, other data or applications that may reside on one or several (e.g., a network) of computer systems, or other definable concepts or content.

Overview and System Architecture

FIG. 1 depicts a system 100 for providing a plurality of time-multiplexed documents according to criteria. System 100 comprises one or more servers 2 operatively connected to one or more providers 8, end users 10, document sources 12, input devices 16, and display devices 18. System 100 enables a document source 12 such as an advertiser to create ads and associate the ads with content-based concepts for triggering targeted display of the advertisements on a time-multiplexed basis. Server 2 may also create documents for time-multiplexed display.

Generally speaking, the server 2 may receive documents and preferences from document sources 12 and cause a plurality of documents to be displayed in a time-multiplexed fashion. For instance, the time-multiplexed documents may be displayed on a billboard or computer monitor to end users 10. In some embodiments, server 2 may receive a request from user 10 or provider 8 (or other requestor) for a document such as an advertisement associated with a concept (e.g., keywords, subject matter, etc.). In response to the request, the server 2 may cause a plurality of documents to be displayed on a time-multiplexed basis. The timing and format of the time-multiplexing may be based on criteria such a relevance to documents to the concept and preferences of document sources 12 associated with each document.

The server 2 may comprise any server, network account provider (e.g., email account provider), hub, central processor, provider, search engine, electronic billboard system, or other entity in a network. Although a single server 2 is depicted, it should be appreciated that multiple servers 2 may be provided and that such multiple servers may share data and operational tasks to achieve efficiency and operation of the functions described herein. The server 2 may also comprise a content provider system. The server 2 may comprise input and output devices for communicating with other various system 100 elements.

Providers 8 may operate separately or in combination with server 2. Providers 8 may provide content pages, search results and/or other types of pages to one or more end-users 10. Content provider 8 may comprise any server, document provider (e.g., a website publisher or other content provider), search engine, or other entity that publishes or makes available information, services, and/or products over an electronic network, such as the Internet. Content provider 8 may comprise one or more of the following, for example: an advertisement listings provider, an electronic document publisher or provider, a website host, a server 2, any other entity that provides electronic documents to users or other entities, or any other provider of content. Additional participants may be included based on various applications. For example, multiple advertisers, providers and end-users as well as multiple servers, modules and databases may be implemented.

End users 10a-10n may comprise persons who may receive documents or other content, by receiving a web page at a user computer. The term end user 10 may also refer to the user's display, computer, or web browser 10, such as Internet Explorer™, which may communicate with providers 8 and server 2.

Document sources 12 may comprise any entity that may submit a document to the server 2 (or provide instructions to create a document). Document sources 12 may comprise any server, web browser, document publisher, or other entity that may request documents, e.g., from server 2.

Document sources 12 such as advertisers may communicate with server 2 via electronic communication, including Internet communications. Providers 8 may include server 2 for providing functionality associated with providing time-multiplexed documents for display.

Input devices 16 may comprise any devices that may receive information from or about users 10, document sources 12, and display terminals 18. For instance, an input device 16 may comprise a user computer 10 that monitors and passes information about a user, such as the time at which a user 10 selected a particular document or the identity of the document. Input device 16 may also comprise a weather-measuring device or any other device that can measure or determine condition or circumstance information related to a display device such as a billboard. Thus, for example, server 2 may receive weather information related to a particular billboard and pass time-multiplexed documents based on the weather. Other user-related and environment-related monitoring devices are contemplated herein, including those (and others) mentioned in commonly assigned U.S. application Ser. No. 10/935,201 filed Sep. 8, 2004 and entitled "Method and System for Targeting a Series of Advertisements to Moving Viewers," the disclosure of which is incorporated herein by reference in its entirety.

Display terminals 18 may comprise any display device that may output documents. For instance, display terminals 18 may comprise televisions, computer monitors, electronic billboards, and other display devices. Display terminal 18 may be configured to display documents on a time-multiplexed basis, e.g., by receiving and executing computer code causing one or more documents to be displayed on a time-multiplexed basis, e.g., with varying durations.

Server 2 may include various modules for providing functionality associated with documents, including document upload module 20, target module 22, content association module 24, preference module 26, auction module 28, document selection module 30, time-multiplexing module 32, document format module 34, link module 36, impression module 38, user module 40, and other module 42. The modules may function separately or in various combinations. While the modules are shown within a single server 2, the modules may also operate among several servers.

Preference module 26 may associate one or more preferences with one or more documents, document types, document sources, or other entities or factors. For instance, preference module may receive preferences from document sources 12 regarding the output or display of documents associated with the document sources. For instance, preference module 26 may enable advertisers to specify criteria about how their advertisements are displayed. Preferences that may be specified may relate to any of the following, for example: the time at which a document may be displayed; the document location (e.g., on a webpage); the number of documents that may be displayed before the document (e.g., zero, one, two, etc.); the length of time the document will be displayed; whether the document will be displayed more than once (e.g., in a random repeating fashion); the type or identity of other documents (or associated document sources 12) that may be time-multiplexed with the document or otherwise be displayed on the same page as the document (e.g., a toy manufacturer's advertisement, a specific movie trailer, a text ad, a graphic ad, an ad containing video or sound, the presence of motion in a document, whether the document is a solicitation); and the manner of switching between documents (e.g., fading to and from black or white before and after each document is displayed). The preferences may be used to determine time-multiplexing for a given document or plurality of documents.

Preference module 26 may enable advertisers to specify criteria about how their advertisements are displayed. Preferences that may be specified may relate to any of the following, for example: the time at which a document may be displayed; the document location (e.g., on a webpage); the number of documents that may be displayed before the document (e.g., zero, one, two, etc.); the length of time the document will be displayed; whether the document will be displayed more than once (e.g., in a random repeating fashion); the type or identity of other documents (or associated document sources 12) that may be time-multiplexed with the document or otherwise be displayed on the same page as the document (e.g., a toy manufacturer's advertisement, a specific movie trailer, a text ad, a graphic ad, an ad containing video or sound, the presence of motion in a document, whether the document is a solicitation); the manner of switching between documents (e.g., fading to and from black or white before and after each document is displayed); other formatting options, such as size; features of a user display device, such as resolution of display; the identity or type of user; and other features or characteristics such as those described or referenced elsewhere herein.

Preferences may be expressed by specifying parameters for any criteria associated with a document, user 10, the display of a document, and/or properties or identities of other time-multiplexed documents. For instance, document source 12 may express a preference to have an audio/video ad displayed to a user who has a volume setting above 50%. A document source 12 may also bid on sharing space with specific document providers 12 or specific documents. For instance, one advertiser may prefer to place an ad immediately after another advertiser's eye-catching blockbuster movie trailer.

Document providers may also bid on such criteria and parameters. For instance, an advertiser may specify a willingness to pay a small premium to be displayed in the time window of 4-6 pm as the first advertisement in a sequence, while another advertiser may bid an additional amount to have a specific ad displayed immediately after an advertisement associated with a professional sports team or between two movie ads. Another advertiser may bid a premium to have an advertisement for an upcoming concert displayed on user computers that have been confirmed to have an active volume and attached speakers (which may be verified on the user's computer settings or system description).

For instance, one advertisement for children's clothing may be associated with a preference for being displayed on child-related webpages or billboards near toy stores. The document may further be associated with a preference for being time-multiplexed with child-related text ads for non-competing child-related products such as toys.

In some embodiments, preference data may be expressed in the form of pricing and/or billing data. For example, the advertiser may specify a price parameter, such as cost per click ("CPC") amount, bid amount or other amount offered by the advertiser. The price parameter may represent an amount that the advertiser is willing to pay each time the advertisement (or other document) is clicked (or otherwise selected). The advertiser may specify a maximum cost per click amount as well as a daily budget. The daily budget may represent how much an advertiser wants to spend per month (or other time frame) divided by the number of days in that month (or other time frame). The server may use this data to match a daily amount to help ensure maximum advertisement exposure evenly throughout each day (or other time period). Additional examples of governing the serving (or delivery) of advertisements based on some cost target, such as cost budget for a given period of time, are discussed in U.S. patent application Ser. No. 10/340,553, filed on Jan. 10, 2003, entitled "Governing the Serving of Advertisements Based on a Cost Target," which is incorporated by reference herein in its entirety. Advertisers may budget their advertising expenditures, while allowing an ad serving entity to maximize its revenue subject to advertisers' budget constraint(s). For example, an exemplary embodiment may estimate an expected cost if an ad were subject to no budgetary constraints and govern the serving of the advertisement based on the expected cost and the budget constraint(s).

Document sources 12 may also bid on any of these preferences. For instance, a document source 12 may bid on sharing space with specific document providers 12 or specific documents. For instance, one advertiser may prefer to place an ad immediately after another advertiser's eye-catching blockbuster movie trailer. Document providers may also bid on such criteria. For instance, an advertiser may specify that it is willing to pay a small premium to be displayed in the time window of 4-6 pm as the first advertisement, while another advertiser may bid an additional amount to have a specific ad displayed immediately after an advertisement associated with a professional sports team. an album from a specific record label. Another advertiser may pay a premium to have an advertisement for an upcoming concert displayed on user computers that have been confirmed to have an active volume and attached speakers (which may be verified on the user's computer settings or system description).

Target module 22 enables an advertiser to specify a target intended audience. For example, the advertiser may specify a preferred language, country or other demographic preference. The advertiser may want to reach potential customers through a content page, search results page and/or other type of page. The advertiser may also specify if the document may be displayed on syndicated sites. In some cases, the advertiser may not specify any target audience or any limitation.

Document upload module 20 may enable an advertiser to upload or otherwise transfer a document to server 2. The document may be uploaded by identifying an address (e.g., URL address, etc.). The graphic may also be downloaded from the advertiser's website or other associated site. The graphic may be retrieved from a database or other source. The graphic may include various visual options, including animation, pop-up ability, sound waves, etc. and may also include text, including text advertisement. The server 2 (e.g., via format module) may size or shape the graphic to fit a predetermined size or shape. In addition, the advertiser may select from a selection of sizes and/or shapes for display. For example, the advertiser may be willing to pay more for a larger size graphic rather than settle for a smaller standard size. By enlarging the ads, an advertiser may increase potential click through by end-users.

Content association module 24 enables a document source 12 (such as an advertiser) to identify one or more content-based concepts (e.g., keywords, subject matter, etc.) for association with a document, e.g., a document associated with the document source 12 such as an ad provided by or associated with an advertiser. For example, an advertiser may identify multiple groups of concepts. The concepts may be used to target the ads to improve potential click through rate. For a search result page, if the search terms entered by an end-user substantially match the concepts (e.g., keywords), an associated graphic may be displayed on a search result page based on a rank. For a content page, if the content page matches the concepts (e.g., subject matter), an associated graphic may be displayed on a content page based on a rank. In addition, an advertiser's web site (or other associated or identified site) may be accessed to retrieve terms and/or phrases throughout the sites or designated pages to formulate a list of potential keywords and/or subject matter selections. The advertiser may select keywords and/or identify relevant subject matter from the list.

Preference module 26 may also enable an document source 12 to specify cost data and/or other price parameters, e.g., for an ad. For example, an advertiser may specify a maximum price the advertiser is willing to pay for each time the graphic is clicked. The advertiser may specify a daily budget. The advertiser may also make modifications to the cost data.

Auction module 28 may implement an auction process. The results of the auction process may help to determine which documents are selected to be displayed in a time-multiplexed fashion in a particular space of a document. The auction process may be used to determine which advertisement to show in which sequence (and other display criteria such as duration). The auction process may become more complicated as the pricing for graphical advertisements and the implementation of various formatting and other preferences may have a premium associated with the display.

For example, placement of advertisements may be based on a click through rate and cost per click (e.g., bid amount or any amount offered by an advertiser) combination (e.g., CTR*CPC). For a graphical advertisement, the cost per click amounts may be different for, different types of ads and also in relation to text advertisements. In another example, the CTR value for graphical advertisements may be adjusted by an amount or a variation of the CTR. A different ranking function, such as CTR'*CPC may be implemented, where CTR' may represent an adjusted CTR for the document (such as an ad). In another example, a ranking function may involve CTR*CPC/z where z may represent a function of the document type. Other variations and adjustments may be implemented. Document type may include a variety of considerations, such as size, animation, color, sound, voice, visual options (e.g., pop-up ability, etc.), type of product or service, images used, or other characteristic associated with the graphic.

An auction-determined rank and other criteria may be used to determine the time-multiplexing of the selected ads. There may be instances where a document (such as a graphical advertisement) may be sequenced or ranked with other documents such as text advertisements. In ranking and sequencing graphical ads with text ads (or other documents), an adjustment may be applied. For example, a graphical advertisement may occupy more space (and/or bandwidth) than a text advertisement. In addition, a graphic may be considered more likely to be clicked on. Thus, an adjustment may be applied when compared to text advertisements. In another example, advertisers may be charged a higher rate for advertisements based on a higher likelihood that the advertisement will be selected. Further, additional costs may be associated for additional enhancements (e.g., animation, sound, music, size, shape, etc.) or other features that may increase the advertisement's likelihood of being selected. In yet another example, to encourage the use of graphical advertisements, a provider may offer an incentive (e.g., credit, compensation, etc.) to an advertiser for displaying graphical advertisements. Additional incentives may be provided for additional enhancements to the documents.

Document selection module 30 may select one or more documents. For instance, document selection module 30 may select one or more documents related to one or more concepts, such as keywords entered into a search query or concepts associated with a particular requested document such as a website.

For instance, the module 30 may select clothing ads for display on a website that provides information about how to knit a shirt. In another example, if the system determines that the ambient temperature is above a certain temperature such as 90 degrees Fahrenheit, then it may select several ads for cold beverages for display at an electronic billboard on the side of a road. Document selection module 30 may also select and provide documents in response to a request from a provider 8, end user 10, or other entity.

In some embodiments, document selection module 30 may select each document individually based on criteria specific to the selected document (e.g., and without regard to any other selected ads). In other embodiments, the selection of one document may be related to and/or based on (e.g., based in part on) the selection of one or more other ads. For instance, document selection module 30 may select a group of documents based on group properties (and/or individual document properties). For instance, document selection module 30 may select one document based on a relevance to a search query and then select a plurality of other documents related to the first selected document. For instance, if an ad for a particular advertiser is selected, then other ads from the same advertiser may also be selected. In this way, ad campaigns for a particular product or brand may be selected. In another embodiment, if two movie ads are selected, then an ad associated with a preference for being shown between two movie ads may be selected for display between the two movie ads.

In another embodiment, a plurality of different document types may be selected and/or excluded from selection. For instance, module 30 may select only one ad from each of several different product categories. In this way, module 30 may select a plurality of ads from non-competing product types, wherein each ad advertises a product that does not compete with any other ad. For instance, on a camping webpage, a plurality of different ads may be selected, each for a different item of camping gear such as a different ad for each of a tent, lantern, sleeping bag, and pocket knife. After each ad is selected, other ads for competing products may be excluded from selection. These ads may be selected for a time-multiplexed display on the camping webpage. After each of the ads has been displayed in a time-multiplexed fashion (or at another time), module 30 may select additional ads for time-multiplexed display on the document. Ads for other tents may be excluded from selection if a tent ad has already been displayed.

The documents selected by document selection module 30 may be time-multiplexed for display by time-multiplexing module 32. Documents may be selected according to any criteria and methods, such as those described in other applications referenced herein.

Time-multiplexing module 32 may determine time-multiplexing criteria related to the display of one or more documents. For instance, time-multiplexing module 32 may determine the time duration for which each document may be displayed. Module 32 may also determine the order in which the documents may be displayed, as well as other time-multiplexing factors and criteria. In this way, time-multiplexing module 32 may determine the manner in which a plurality of documents may be displayed in a time-multiplexed fashion, e.g., at an electronic billboard or in a specific location on a webpage. Generally, the earlier and longer the document is displayed, the more likely an end-user will notice it, thereby improving the potential for a click through (i.e., an end-user clicking on the document).

Time-multiplexing criteria may also determine space-multiplexing criteria that is related to time-multiplexing criteria. For instance, a single ad may appear in different places, such as different ad locations, at different times on a single webpage. Accordingly, module 32 may determine time and space criteria related to the display of various documents at the different locations in a time-multiplexed fashion. In one example, three different ads may be cycled clockwise between three different ad locations. After each ad has appeared at each location once, a new set of three ads may be rotated through the various locations.

Various criteria may be used in determining the time-multiplexing (and space-multiplexing) of documents, such as preferences, relevance, performance criteria, and environmental information. According to one example, the ordering of the document may be determined by comparing the product of the cost per click and the click through rate for each document. Other methodologies for ordering and timing ads and other documents may be implemented. For example, other price parameters and/or performance parameters may be considered. Any preferences may also be considered. For instance, if a series of time-multiplexed ads will be streamed to a user computer, time-multiplexing module 32 may implement a preference to display text ads first, since they are typically smaller files that can be transferred to user computers with little or no delay while image ad files may be downloaded as a background process. Alternately, time-multiplexing module 32 may also implement a preference for image advertisements since they are more likely to be noticed by users.

Some embodiments may apply time-multiplexing criteria for a plurality of documents based on the time during which a document is actually viewable on the user's screen. For instance, an ad's allotted duration may be tolled according to viewable time instead of absolute time. In these embodiments, time during which the document space is not viewable on the user's computer may not be tolled against the time for a current ad or other document. For instance, the time during which a user's browser window is minimized may not count against an ad's allotted time. In other embodiments, the time during which a document space is not visible to the user may be used as an opportunity to unobtrusively transition to the next document.

Format module 34 may format one or more time-multiplexed documents, e.g., in a composite document such as a website. For instance, format module 34 may determine the manner of transitioning between two or more time-multiplexed documents. Some possible transitions include, for instance: immediate switching; fading in and out to white, black, or a default color (such as the color of a website background); and moving into position from the left or right side (or other side) of a document. Any manners of transition are contemplated herein.

Format module 34 may also determine the positions of various documents within a composite document. For instance, time-multiplexed advertisements may be displayed as a banner, across the top of a page (e.g., search page, content page, etc.), along the side of search results, and anywhere else on the page. Other ads and documents may also be configured on the page in a manner that is not time-multiplexed.

Format module 34 may determine format criteria based on any criteria described herein. For instance, a preference for a particular type of transition may be associated with a particular document or document type, and that transition may be applied at the beginning or end of the document. Format module 34 may also establish a uniform transition for the plurality of documents, e.g., based on the type or content of the composite document or time-multiplexed documents.

Format module 34 may also scale the document to fit a predetermined size or shape (e.g., fill a rectangle of uniform size with the document). Ads may be scaled to different sizes. For example, certain ads may be sized or shaped differently based on an advertiser's willingness to pay an additional amount (or other incentive or credit). (It should be appreciated that time-multiplexed ads need not appear in the exact same space, so time-multiplexed documents may have different shapes.) Also, for different display environments, the document may be sized based on the available space. For example, for a content page, the document may be intended for placement on a different size or shape than a search result page. Other environments for display may be considered.

Link module 36 may perform operations related to hypertext links and other links embedded in (or otherwise associated with) documents. Electronic documents such as ads can include an embedded hypertext link. Website-based advertisements are often presented to their advertising audience in the form of "banner ads"-i.e., a rectangular box across the top of a web page that includes a graphic. Oftentimes, the graphic is animated to attract the audience's attention. When a member of the advertising audience selects one of these banner ads by clicking on it, one or more embedded hypertext links typically direct the viewer to the advertiser's website. This process, wherein the viewer selects an advertisement, is commonly referred to as a "click through," and may be used to refer to any type of user selection. The ratio of the number of click throughs to the number of impressions of the advertisement (i.e., the number of times an advertisement is displayed) is commonly referred to as the click through rate of the advertisement.

Link module 36 may determine if and when a user has selected a document containing a link. In this way, link module 36 may retrieve and determine performance information related to a specific document or group of documents.

Impression Module 38 may determine information related to the display or impression of a document. For instance, impression module 38 may determine whether a document has been received by a user 10, and whether the document has been output at a user terminal 10.

Impression module 38 may also determine more specific and accurate information about an impression. For instance, impression module 38 may determine whether a document (e.g., a document containing a link) is actually visible to a user, and it may track the time duration during which the document is actually visible to the user. For instance, impression module 38 may determine whether an ad on a web page of a user's browser is actually visible to the user. For instance, impression module 38 may determine whether the browser is in a minimized status on the user's desktop. It may also determine when and if a particular document is actually visible on the user's desktop (or other display interface). Impression module 38 may accordingly track impressions of a document on a more accurate basis.

In this way, impression module 38 may determine information that may be used in causing a plurality of documents to be time-multiplexed at a display. For instance, if several documents are intended to be actually displayed to a user for five seconds each before switching to the next document, then impression module may keep track of the amount of time that each document is actually output on a user's computer monitor 10. The impression module 38 may prevent the display of a subsequent document until a first document has received its full "true" impression time.

Impression module 38 may also cause a composite document to switch to a subsequent document in the sequence when the document space is not visible on the user's screen (e.g., when the window is minimized). This minimizes the extent to which a user is exposed to a potentially distracting transition between two ads or other documents.

User module 40 may pass information to and receive information from (or about) displays 18 and users 10, e.g., directly or indirectly through providers 8. Importantly, user module 40 may cause a plurality of time-multiplexed documents to be displayed according to time-multiplexing criteria and formatting criteria (such as those established by time-multiplexing module and format module).

User module 40 may cause a time-multiplexed display in a variety of ways.

In some embodiments, user module 40 may cause code to be downloaded and/or executed on a user computer 10 or display device 18. The code may be effective to cause a time-multiplexed display of a plurality of documents at the user computer 10 or display device 18. For instance, user module 40 may cause a time-multiplexing program or system (e.g., similar to that described for server 2) to exist and run on a user computer. In some embodiments, user module 40 may cause a toolbar to be installed on a user computer, and the toolbar may implement document time-multiplexing and other functions. The time-multiplexing code may be associated with (e.g., downloaded in conjunction with) the toolbar, such as the Google™ toolbar which can be used in conjunction with a user's web browser. The time-multiplexing system at a user computer may cause a plurality of documents to be displayed in a multiplexed manner as described herein. The code (or toolbar) at a user computer 10 may pass information about the user computer 10 to server 2.

For instance, in some embodiments user module 40 may pass code to an output terminal such as Javascript (or other client-side support), wherein the Javascript switches the document source based on client-side timers. In this way, the Javascript can effectively implement a time-multiplexed display of various documents.

In another embodiment, user module 40 may generate a server-side document such as a Flash (or another multimedia format) document that contains the timings, transitions, and other time-multiplexing and document display features. User module 40 may then serve a link to that file (e.g., an swf file).

In some embodiments, user module 40 may generate and serve a parameterized object (such as a Flash object) that references the various other documents (such as static images) internally. The object may manage the timings and other display features.

In yet another embodiment, user module 40 may generate on the server 2 an animated file such as a GIF or PNG with appropriate timings and then use client-side support to determine which frame the image is on. If a user 10 selects one of the plurality of time-multiplexed documents, client-side support may determine what the time-offset of the user selection was. In this way, the identity of the selected document may be determined.

User module 40 may also accomplish other functions. User module 40 may monitor and store information relating to the user terminals 10 and other displays 18. For instance, user module 40 may inspect system information to determine information about any of the following, for example: presence of audio speakers; volume (or mute control) of audio; resolution of display; activity at user terminal (e.g., behavior of user, including websites visited and documents selected) and activity level of user terminal; information actually displayed at terminal (e.g., whether a document on a webpage was ever actually visible on a user's display); and other information. Time-multiplexing criteria may be based on such information.

For instance, an audio-based ad (such as an ad for an upcoming concert) may have an associated preferences regarding its output on computers having active speakers with a volume above 25%. For instance, the audio-based ad may have an associated preference for a time duration of twenty seconds if the audio portion of the ad lasts for twenty seconds. If the computer has been muted (or does not have speakers), then it may have a preference for being displayed for only ten seconds (so that readers may view the concert details in text format). If the speakers are muted or nonexistent, the ad may have a preference for switching to another non-audio based ad instead. For instance, an advertiser may express a preference for one type of ad for certain output conditions (e.g., the presence of audio speakers), and a preference for a substitute ad for other conditions (e.g., when the first conditions are not met).

The user module 40 may also determine which of several multiplexed documents were displayed to and/or selected by a user 10. If a user selects one of the plurality of documents that is currently occupying the time-multiplexed space, the program (such as a toolbar) may determine which of the plurality of documents was displayed at the time the user made the selection and thereby determine the identify of the document (e.g., and also the identity of any link or linked document). The toolbar (or server 2) may also detect the size of the user's screen and display ads accordingly.

In some embodiments, user module 40 may determine whether a particular document is currently viewable on a user's screen. For instance, a user may scroll down a website so that a banner ad at the top of the page is no longer viewable on the user's display. Some embodiments may apply time-multiplexing of a plurality of documents based on the time during which a document is actually viewable on the user's screen. For instance, one or more advertisements may be rotated according to viewable time instead of absolute time. In these embodiments, time during which the document space is not viewable on the user's computer may not be tolled against the time for a current ad or other document.

User module 40 may determine if and when a user 10 selects a document passed to the user 10 from server 2. Accordingly, user module 40 may determine when a user 10 selects a particular advertisement. In some embodiments, timing information may be used to determine which document was selected by a user, e.g., if the identity of the selected document cannot otherwise be readily determined.

In some embodiments, user module 40 may determine whether a particular document is currently viewable on a user's 10 screen. For instance, a user 10 may scroll down a website so that a banner ad at the top of the page is no longer viewable on the user's display. User module 40 may inspect the user's computer to determine the time during which the ad is not viewable.

Other module 42 may have other functions.

The modules of server 2 may store, access and otherwise interact with various sources of data, including external data, databases and other inputs.

The modules may communicate with a plurality of databases, which may also function collectively or separately. Databases may include document database 52, concept database 54, impression database 56, performance database 58, preference database 60, link database 62, user database 64, and other database 66.

A document database 52 may store documents such as an advertisements or other documents that may be provided to content providers 8, users 10, and document requesters 12. For instance, a user 10 may click on a hypertext link on a web page that causes the user's web browser to request a document from the server 2. The server 2 may then provide the document to the user 10.

Concept database 54 may store keywords and other concepts associated with documents. For instance, in order to select a document associated with a specific concept, the document selection module 30 may access the concept database 54 to match the specific concept with one or more concepts in the database. In this way, a document can be selected that is related to the specific concept.

Impression database 56 may store a number of impressions of a particular document. The number of "actual" (e.g., verified) impressions may be distinguished from the number of times a document was output to client terminal. Also, the actual time during which a document was visible on a monitor may be stored.

Performance database 58 may store information associated with the performance of one or more ads or other documents. For instance, performance database 58 may store information about a document's cost per click (CPC), number of impressions (e.g., on a time-weighted basis), click through rate (CTR), and other performance measures.

Preference database 60 may store information associated with preferences, e.g., preferences associated with document sources 12 and providers 8.

Link database 62 may store information associated with one or more documents linked to a network site. The linked network sites may be identified by link module 36. For instance, link database 60 may store URLs of links embedded in a reviewed document.

User database 64 may receive and store information associated with programs and systems operative at user computers and also information received from user computers, such as information related to an impression or selection of an ad or other document.

Other database 66 may store other information.

It should be understood that the server, processors, modules, and databases described herein may perform their various functions (e.g., providing time-multiplexed documents) automatically or via an automated system. As used herein, the term "automatically" refers to an action being performed by any machine-executable process, e.g., a process that does not require human intervention or input.

Illustrative System Environment

Figure 2:
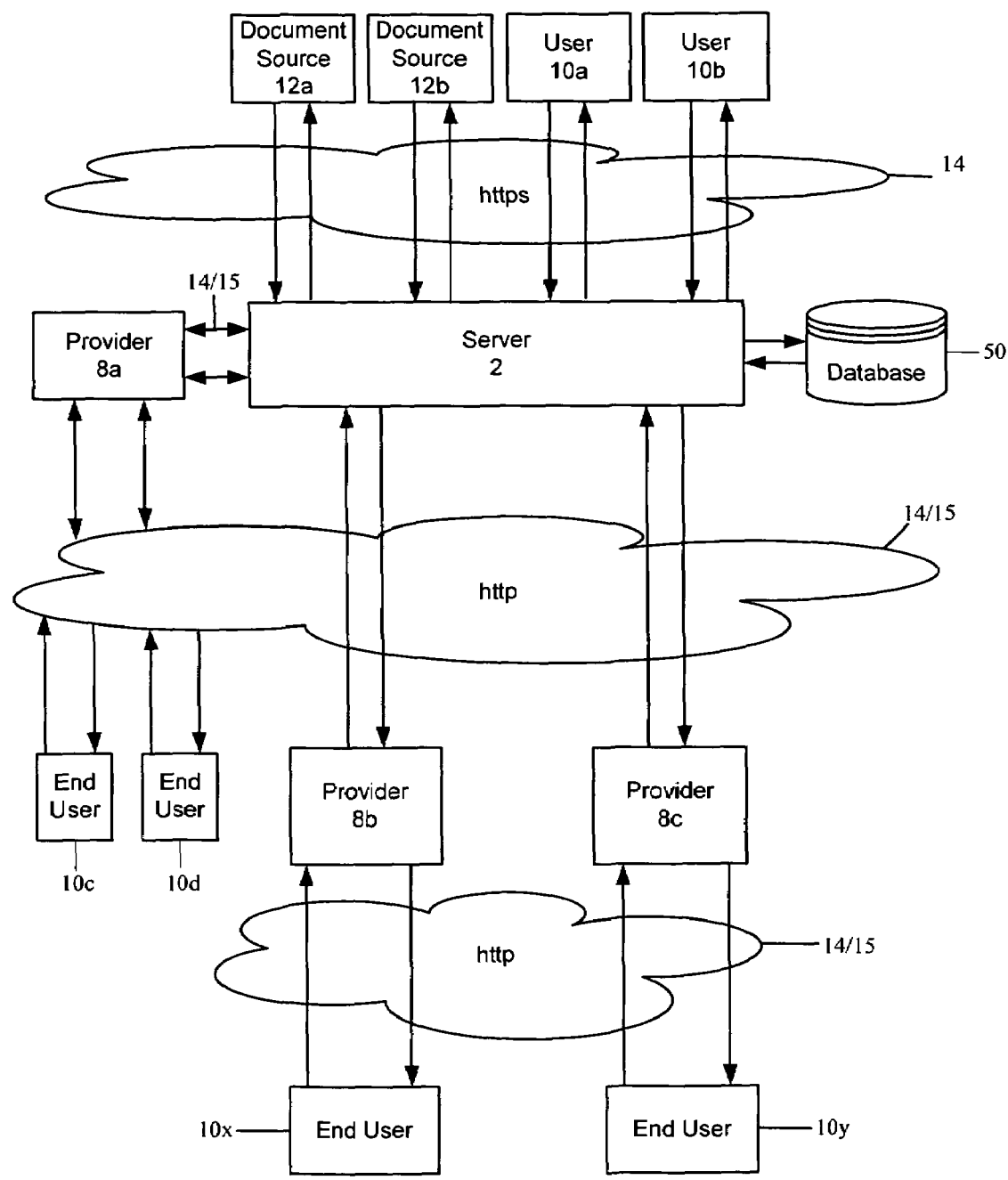
FIG. 2 depicts an exemplary system environment according to various embodiments of the invention.

FIG. 2 depicts exemplary system 100 environments according to various embodiments of the invention. In these systems, only the server 2, provider 8, and database 50 are shown. The other components may be linked to these components as shown in FIG. 1 via a network, e.g., a wireless network or the Internet. The system elements may communicate over http networks 14 and secure https networks 15, as well as other networks.

Further information about system 100 environments may be found in the U.S. Applications incorporated herein, above.

Illustrative Verification Process

Figure 3:
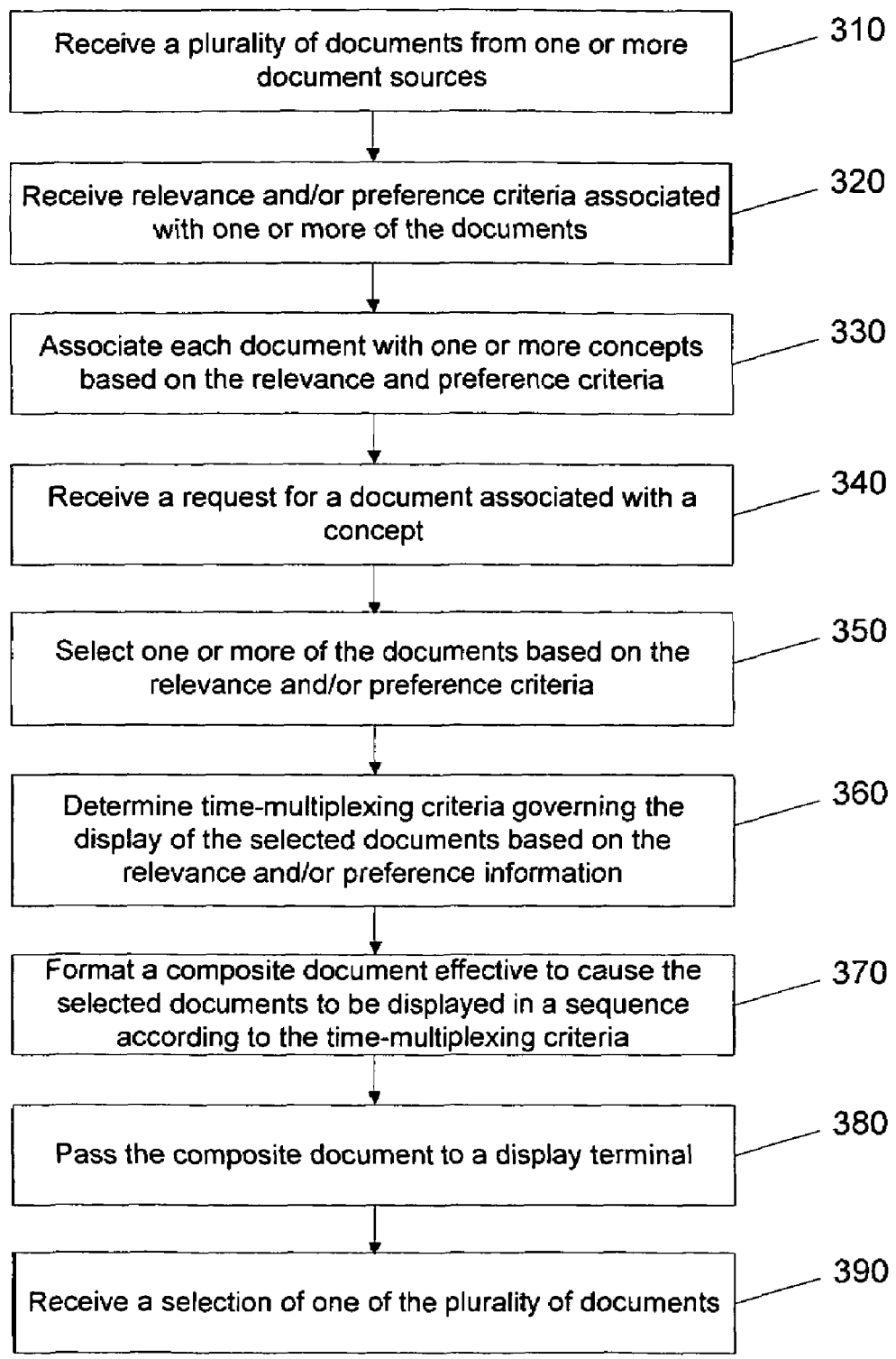
FIG. 3 illustrates a flow chart showing a method for time-multiplexing the display of a plurality of electronic documents according to an embodiment of the invention.

FIG. 3 illustrates a flow chart showing a method for time-multiplexing the display of a plurality of electronic documents according to an embodiment of the invention.

At block 310, a plurality of documents may be received from one or more documents sources 12. For example, an advertiser 12 may upload an advertisement to the server. The advertisement may include an image, animation, design, logo, picture and/or any other visual or audio display. The ad may be uploaded by the advertiser entering an associated address, e.g., URL, for the ad. In addition, the ad may include additional display options, such as ability to expand (e.g., to a part of the page, the entire page, etc.), animation, sound (e.g., music, dialog, etc.), pop-up ability, and/or other display options. For example, an interactive graphical advertisement may expand to a larger and/or different graphic when a cursor hovers over the ad.

In some embodiments, server 2 may generate or modify documents, e.g., based on instructions from advertisers or other document sources.

At block 320, relevance and/or preference criteria associated with the one or more documents may be received and/or determined. For instance, a bid on one or more keywords may be received in connection with each advertisement.

In some embodiments, an advertiser may specify a target language and/or target countries for a particular advertisement document. In addition, the advertiser may target a type of customer based on demographic and/or other data. Further, the advertiser may intend the document to be displayed on content pages, results of search pages and/or other types of display. Content pages may refer to any page that contains content, including web pages, emails, print material or other media. For example, advertisements directed to children may be restricted from display on adult sites or sites that promote violence. The advertiser may selectively choose whether to allow the advertisement to be displayed on syndication sites. Syndication sites may refer to third party websites that receive advertisements from the provider for a compensation. In addition, the advertiser may be asked and/or required to accept a contract that would free the server from copyright restrictions associated with storing and displaying a copy of the graphic (e.g., logo, trademark, etc.).

At block 330, the document may be associated with various criteria such as relevance, preference, performance, and environmental criteria. (It should be appreciated that performance information may be treated as preference information for purposes of this invention since there may be a "preference" for a particular type of performance.)

For example, one or more content-based concepts (e.g., keywords, subject matter, etc.) and bids may be associated with the document. For example, an advertiser may identify one or more keywords which would potentially trigger a display of the document. By specifying concepts, the document will be displayed when an end-user expresses interest in subject matter associated with the concepts. For example, a food delivery service may select keywords such as "food" and "delivery" thereby increasing the likelihood of display of a relevant document. When an end-user is searching for web pages associated with "food" and "delivery," an advertisement associated with the food delivery service may be displayed. Additional groups of keywords may be applied as well. The same food delivery service may select additional groups of concepts to include other keywords, such as "grocery" and "deliver" and may also include another group, which may include a key phrase, such as "food delivery service in Baltimore area."

In some embodiments, if a request for content associated with a specific keyword is received, then the server may select those documents associated with the specific keyword that have the highest associated bid on the keyword.

One or more content-based concepts may be associated with each document. Concepts may be identified or associated before or after the document is uploaded. The advertiser may provide keywords to be associated with the document. Concepts may be words or terms that may trigger a display of the document in association with a content page, a search result page or other page. In another example, a server may automatically extract keywords from the advertiser's website or other designated web page or location. A list of potential keywords may be displayed for the advertiser to select from. In addition, an advertiser may specify a concept, which may include a subject matter and not necessarily words found within a content page. Other methods for associating concepts (e.g., keywords, subject matter, etc.) with a document may be implemented.

In another example, an advertiser may specify content-based concepts directed to a subject matter. For example, an advertiser for car repair service may want to display an advertisement on web pages directed to car repair where the terms "car" and "repair" may or may not appear in the content pages.

In another example, one or more documents may be associated with one another. For instance, one or more advertisements may be associated with an ad group comprising a group of advertisements. For example, the group of advertisements may include non-graphical, text-only or other advertisements associated with the same (or related) advertiser that created the graphical advertisement. Other methods for grouping advertisements may be applied. This ad group may be triggered using common criteria (e.g., the same (or related) keywords, subject matter or concepts, etc.). Additional examples of managing online advertising by associating two or more keywords with an advertisement and associating a bid, collectively, with the two or more keywords are discussed in U.S. patent application Ser. No. 10/340,193, filed on Jan. 10, 2003, entitled "Pricing Across Keywords Associated with One or More Advertisements," which is incorporated by reference herein in its entirety.

Criteria such as a price parameter (e.g., a cost per click amount, etc.) may be identified for (and associated with) a document. The price parameter may be based on a maximum amount an advertiser is willing to pay for each click. A performance parameter (e.g., a click through rate, conversion rate, etc.) may also be identified for the document. For example, the click through rate may represent a number of clicks divided by a number of impressions where the impressions represent each time the document appears on a page (e.g., a content page, a search result page, etc.) for display to an end-user. The click through rate may be based on historical data and may be updated after a predetermined passage of time (e.g., each hour, each day, etc.) and/or may be updated after a predetermined number of clicks (e.g., each click, every 3 clicks, every 10 clicks, etc.) or impressions. Other price parameters and/or performance parameters may be implemented.

Certain days or time frames may be targeted for increased exposure. For example, during the holiday season, an advertiser may be willing to spend more on advertisement to increase exposure. In addition, peak Internet usage times may also trigger additional advertisement exposure. Additional examples of determining and using time information (e.g., end user local time information, including local time-of-day, local day-of-week, local date, and/or local season information, etc.) for improving usefulness and performance of advertisements are discussed in which is incorporated by reference herein in its entirety.

An advertiser may specify content-based concepts (e.g., keywords, subject matter, etc.) and a price parameter (e.g., a maximum amount an advertiser is willing to pay for each click) where the advertiser pays only when an end-user clicks on the advertisement. Additional costs may be saved by automatically reducing the actual CPC to a lowest cost needed to maintain the advertisement's position on the results page (e.g., content page, search results page, etc.). Additional examples of presenting advertisements and managing advertising costs are discussed in U.S. patent application Ser. No. 10/340,543, filed on Jan. 10, 2003, entitled "Automated Price Maintenance for Use With a System in which Advertisements are Rendered with Relative Preferences," U.S. patent application Ser. No. 10/676,369, filed on Oct. 1, 2003, entitled "Determining and/or Using End User Local Time Information in an Ad System," and U.S. patent application Ser. No. 10/340,542, filed Jan. 10, 2003, entitled "Automated Price Maintenance for Use With a System in Which Advertisements are Rendered with Relative Preference Based on Performance Information and Price Information," which are incorporated by reference herein in their entireties. Advertisements may be ordered based on accepted maximum ad bid information, ad performance information, advertiser preferences, and/or any combination of these criteria. For example, this information may be used to determine a sequence. Cost may be determined based on the accepted maximum ad bid information and the next lower position value.

The document may be stored in a database. The document may be associated with the one or more concepts, where the concepts may be stored with the document or in a separate database. In addition, the document may be associated with multiple groups of concepts.

At block 340, a request for a document associated with a concept may be received. For instance, server 2 comprising a search engine may receive a search query from a user.

It should be understood that the action of block 340 is not necessary, e.g., in the context of electronic billboards. In some embodiments, other document selection criteria may be determined. For instance, the criteria may be based on information received from an input device 16, such as a temperature of ambient air. Information about one or more end users or viewers 10 may also be used to determine the selection of documents for display, e.g., at an electronic billboard.

At block 350, a plurality of documents may be selected for display based on various criteria, such as relevance, preference (such as performance preferences), and environmental conditions. For instance, documents may be selected based on a bid for keywords related to the search query. For instance, the documents may be selected as the result of an auction based on the keyword bids (e.g., as described elsewhere herein). Documents associated with the top five "winners" of the auction may be selected for multiplexed display. In some embodiments, of the documents having a certain relatedness to an identified concept, those five documents having the highest bids for the concept may be selected.

In one example, a plurality of movie or game-related advertisements may be selected to be displayed on a webpage related to a specific movie and game franchise. The plurality of advertisements may be selected based on an auction process or other aggregated factors.

At block 360, time-multiplexing criteria governing the display of the selected documents based on the relevance, preference, and/or environment information may be determined. For instance, the sequence and duration of each ad may be determined. For instance, two text ads may occur first in the sequence, each having a five second duration, while a ten second video-based ad may be ordered third but have a longer duration (e.g., ten seconds). The sequence and duration may be based, e.g., on bid and relevance. For instance, the document with the highest bid and highest relevance (e.g., to a requested concept) may be displayed first and for the longest duration. The least relevant selected document may be displayed last and for the smallest duration. In another embodiment, the sequence and display may also be determined according to the results of an auction (e.g., based on bids associated with each document).

The sequence of the documents and the duration of display for each document may be based on various criteria such as relevance, preferences, and environmental conditions. For instance, the sequence may be based on price parameters (e.g., the costs per click, etc.) and performance parameters (e.g., click through rates, etc.). According to an example, the effective ordering may be determined by multiplying the cost per click and the click through rate. In one example, a higher advertisement's CPC or CTR results in a higher advertisement position. Because this ordering system rewards well-targeted, relevant advertisements, an advertiser cannot be locked out of the top position as an advertiser would in an ordering system based solely on price. If an advertisement is irrelevant, end-users are less likely to click on the advertisement thereby forcing the advertisement to move down the page. Similarly, if an advertisement is relevant, it is likely to rise to the top without additional payment from the advertiser. Additional examples of ordering advertisement using scores where the scores may be determined using, at least one of accepted advertisement price information and advertisement performance information are discussed in U.S. patent application Ser. No. 10/445,376, filed on May 23, 2003, entitled "Scoring, Modifying Scores of, and/or Filtering Advertisements Using Advertiser Information," which is incorporated by reference herein in its entirety. The score may be determined (or adjusted) using, at least, advertiser information. In addition, advertiser information may be used to filter out advertisements. Additional examples of ordering advertisements in a manner that maximizes relevance and economic values are discussed in U.S. patent application Ser. No. 10/112,656, filed on Mar. 29, 2002, entitled "Methods and Apparatus for Ordering Advertisements Based on Performance Information" and U.S. patent application Ser. No. 10/112,654, filed on Mar. 29, 2002, entitled "Methods and Apparatus for Ordering Advertisements Based on Performance Information and Price Information," which are incorporated by reference herein in their entirety. Advertisement ordering may be based on accepted advertisement price information and/or advertisement performance information where price information and/or performance information may be weighted or otherwise adjusted.

Various modifications may be applied to time-multiplexing ads and other documents. For example, a premium (or negative discount or other incentive or disincentive, etc.) may be applied for advertisements of various qualities and types. For example, a graphical advertisement with enhancements (e.g., graphical/richer media advertisements, animation, sound, etc.) may be charged an adjusted CPC, CTR or other factor. More specifically, richer media advertisements may be charged a higher (or lower) rate In addition, both price parameters and performance parameters may be adjusted. For example, if a maximum CPC is $0.20 for a certain advertisement, an adjustment of $0.05 may be added based on advertisement type (e.g., graphical advertisement, enhancements, etc.). Similarly, different advertisement types may be assigned varying values of adjustment. For example, for a graphical advertisement, an adjustment of $0.05 may be applied while an adjustment of an additional $0.10 may be applied if the graphical advertisement includes animation. Various increments and other considerations may be implemented.

In addition, when a maximum CPC (or other price parameter) is selected for concepts, an estimated average advertisement position per concept (e.g., keyword) may be provided where the estimate may be based on a maximum CPC and an average CTR for each of the concepts selected by the advertiser.

Some sites may have a limited amount of advertisement space, thereby restricting the number of advertisements for display. For example, some sites may only allow three advertisements per page. Depending on the size and type of advertisement, additional restrictions may be placed. For example, some sites may only allow two text advertisements and one graphical advertisement.

The same or different criteria may be used to select documents in block 350 and time-multiplex documents in block 360. For instance, document selection and time-multiplexing may both be based on bids and click-through-rates. However, in some embodiments, selection may also be based on content-appropriateness, while the time duration of a particular document may also be based on the amount of text content in the document.

At block 370, the selected documents may be caused to be displayed in a time-multiplexed fashion according to the time-multiplexing criteria. For instance, three movie-based ads may be simultaneously passed to a user terminal with instructions about when the user terminal should play them. The user terminal may then execute the instructions and play the ads according to the time-multiplexing criteria.

It should be appreciated that the manner of causing the documents to be displayed may depend on the specific output terminal. For instance, javascript may be preferred in some circumstances, while a flash object may be preferred in other circumstances. For instance, javascript (or flash) may be preferred when the output terminal is determined to have a very high data transfer speed.

In some embodiments, a webpage may be passed to an output device, wherein the webpage comprises code effective to implement the time-multiplexing criteria at the output device. In some embodiments, a file containing code effective to implement the time-multiplexing criteria at a display device 10, 18 may be generated, and a link to the file may be passed to the display device 10, 18. In some embodiments, a parameterized object may be passed to the output device, wherein the parameterized object references the plurality of selected documents and implements the time-multiplexing criteria. In other embodiments, user module 40 may generate an animated file comprising the plurality of documents to be passed to the output device 10, 18, wherein the animated file causes the documents to be displayed according to the time-multiplexing criteria.

At block 380, the selected documents may be passed to (and/or displayed at) a display terminal in a time-multiplexed fashion according to the time-multiplexing criteria. For instance, the user computer may execute code that causes the three documents to be displayed according to the time-multiplexing criteria established at the server. For instance, the most relevant text ad may be displayed first while the video ad is streaming to the user computer. After the first text ad is displayed for five seconds, the next ad may be displayed. Formatting such as transitions may be implemented by client-side code as well.

At block 390, a selection of one of the time-multiplexed documents is received. For instance, a user may click on one of the three movie-related advertisements. The user computer may store information about the identity of the selected document, e.g., in a cookie or in a file associated with a toolbar program or other program related to the server operative at the user terminal. The user computer may also pass such information to the server, e.g., at the time of selection or at a later time. For instance, the server may receive the stored information on a periodic basis from a toolbar program or at a time when the server receives cookie information from a user computer.

In some embodiments, the user computer may pass information about the time at which the document was selected. Based on such time information, the server may determine which document was selected.

The actions of all or merely some of the blocks may be accomplished within the scope of this invention. The actions may be completed in any order, and each action may overlap in time with one or more other actions.

Figure 4:
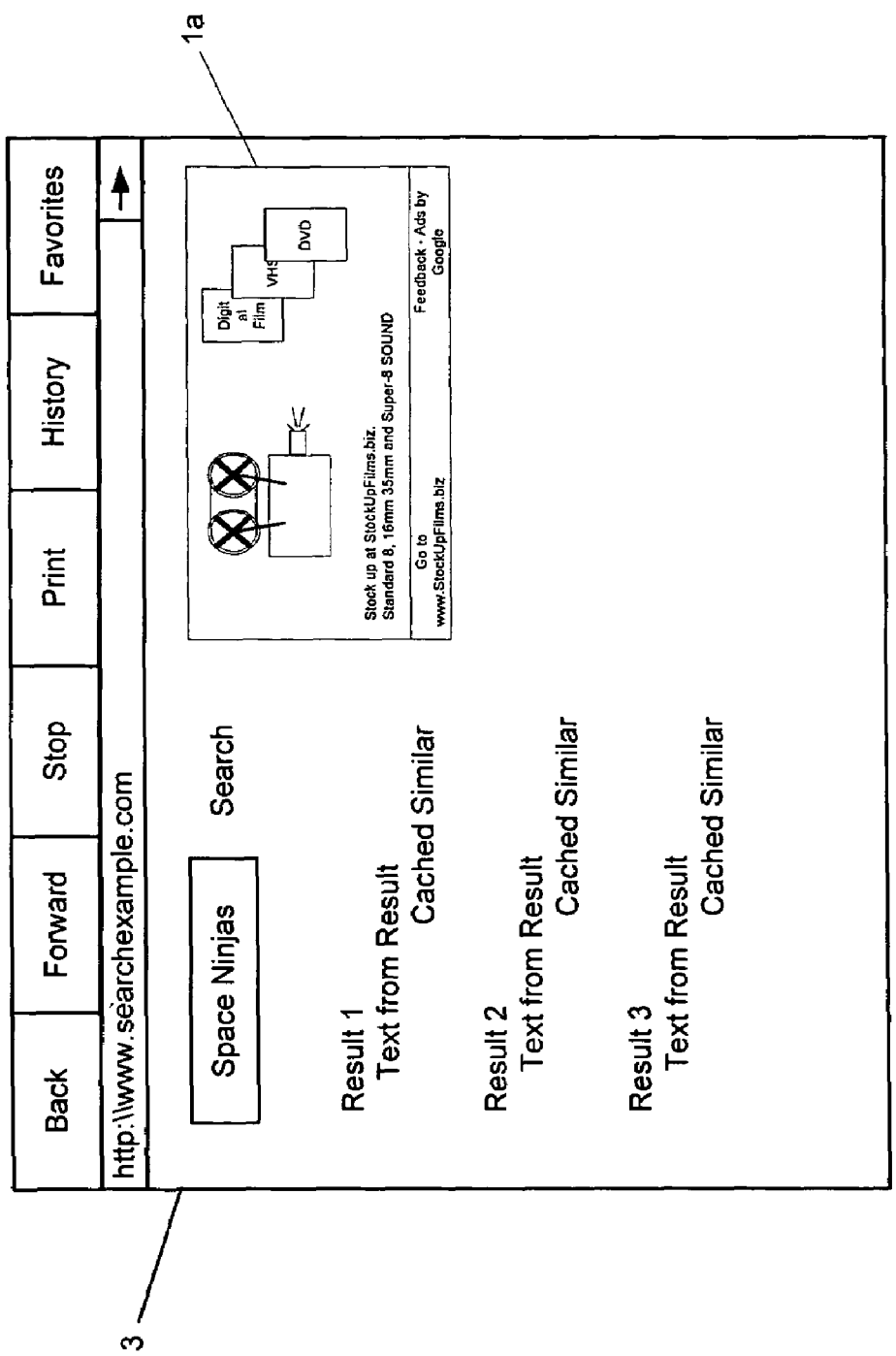
FIGS. 4-6 collectively depict a plurality of documents that may be displayed on a time-multiplexed basis according to an embodiment of the invention.
Figure 5:
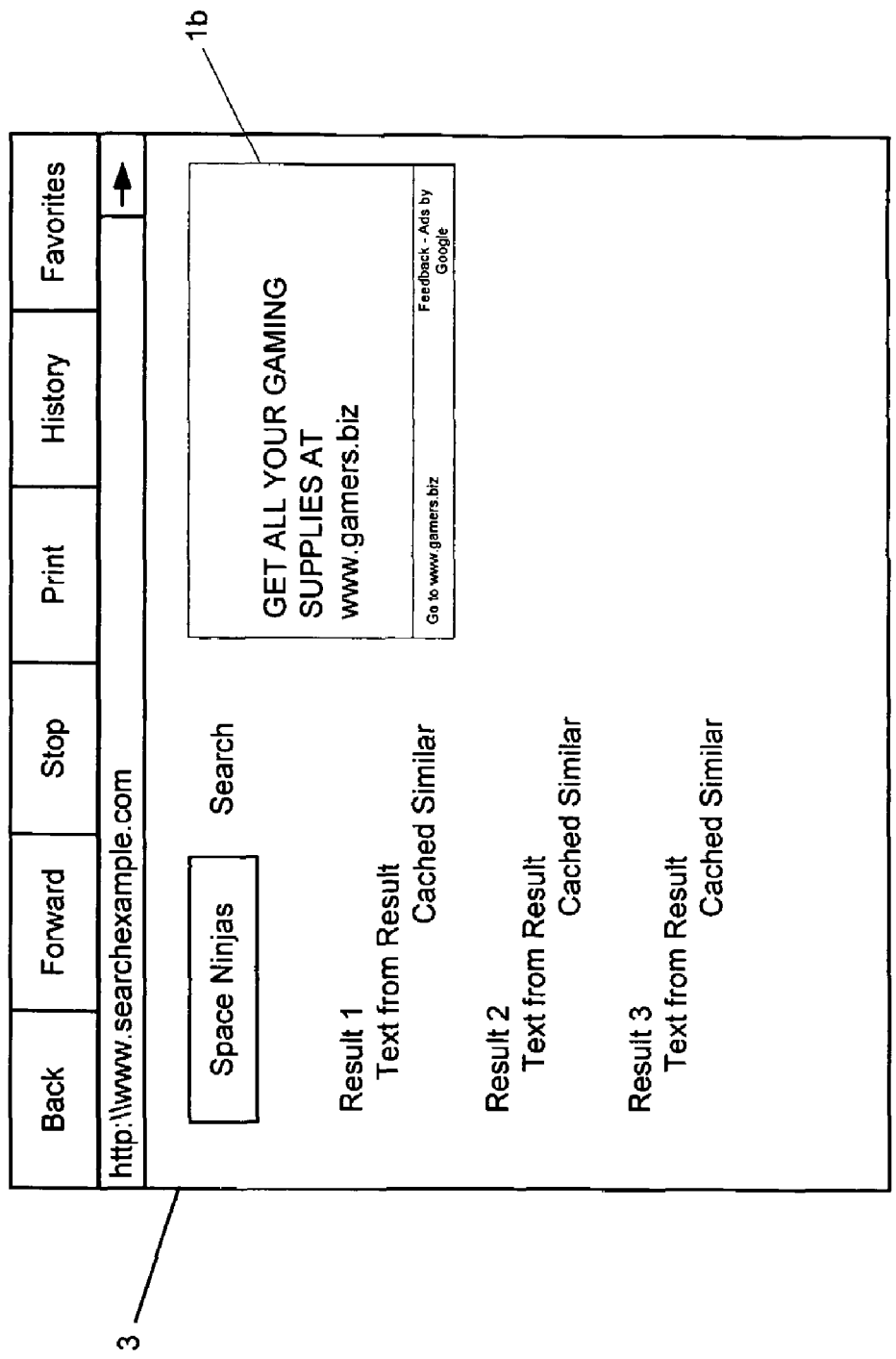
Figure 6:
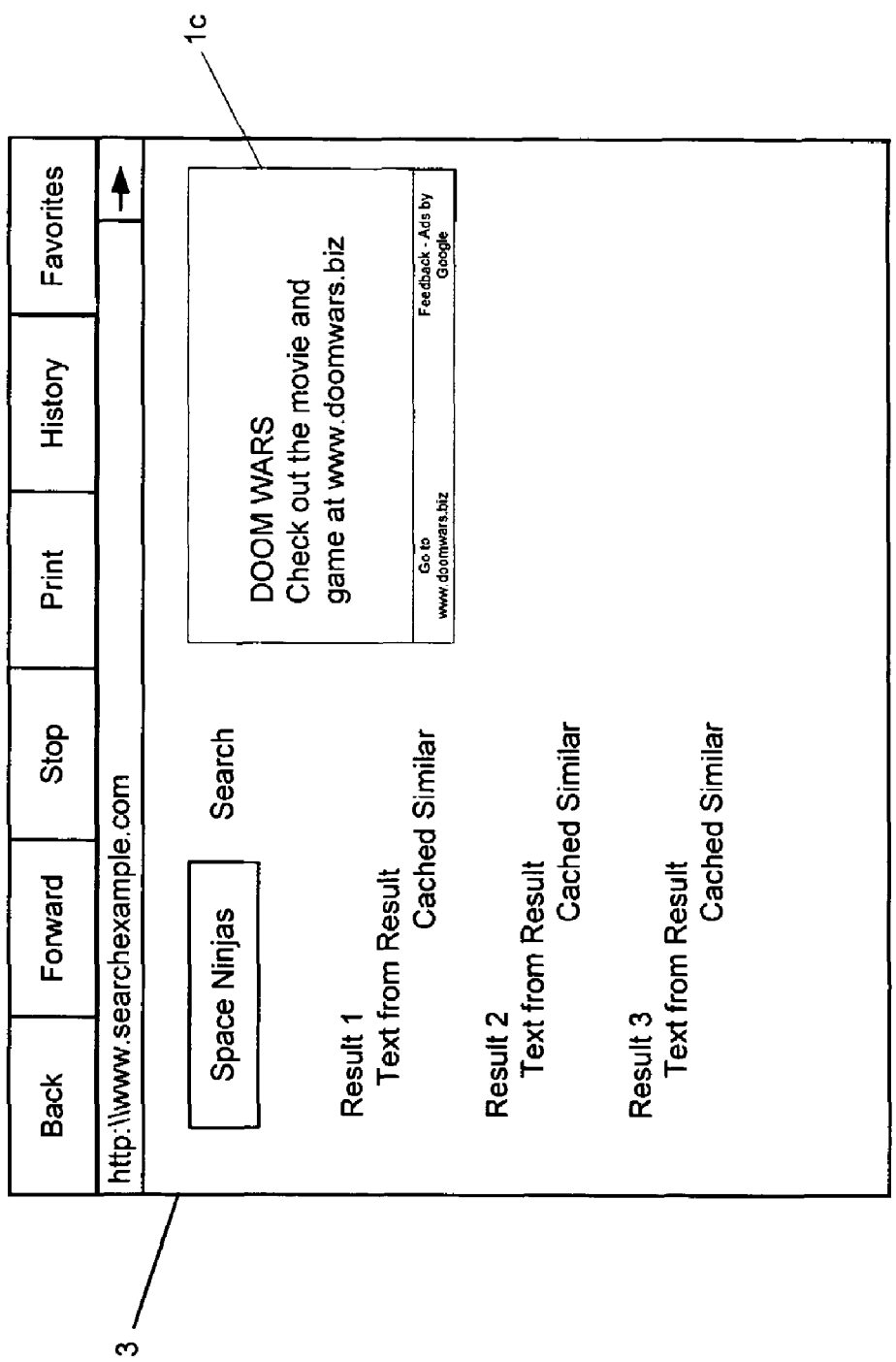

FIGS. 4-6 collectively depict a plurality of documents 1a-1c that may be displayed on a time-multiplexed basis, e.g., on a webpage 3, according to an embodiment of the invention. The documents 1a-1c shown in FIGS. 4-6 may be selected for display based on various criteria such as a relevance to a concept, e.g., the search query "Space-Ninjas." Here, "Space Ninjas" may be the title of a blockbuster summer movie and video game. The documents 1a-1c may be displayed in a time-multiplexed manner that is determined based on various criteria, such as an amount of a bid. For instance, each document 1a, 1b, 1c may be displayed in an order and for a duration corresponding to an associated bid on the keywords "Space Ninjas," wherein the document with the highest associated bid is displayed first and for the longest.

FIG. 4 shows a webpage 3 comprising a document 1a. Document 1a may comprise a document that is displayed on a time-multiplexed basis according to an embodiment of the invention. Here, the document 1a comprises an advertisement for movie-related products such as DVDs for a company called StockUpFilms. The document 1a may appear on a website comprising a user search result for the search query "Space Ninjas."

Document 1a may be selected for time-multiplexed display on this search result page based on its relevance to the keyword "Space Ninjas." For instance, the ad 1a may have an associated high bid on all summer movie titles including "Space Ninjas." It may be displayed first because, e.g., its associated bid for the keyword "Space Ninjas" is higher than any other document's associated bid. The document 1a may have been previously (or simultaneously) approved for display based on a determination that it does not contain offensive content.

The document 1a may be displayed on a time-multiplexed basis with other documents, such as those shown in FIGS. 5 and 6.

FIG. 5 depicts another exemplary document 1b displayed on the webpage 3. Here, the document 1b comprises an advertisement for a website called www.gamers.biz that sells video game-related products. This ad 1b may have also been selected for display due to a corresponding high bid for the term "Space Ninjas." This document 1b may be displayed-second because, e.g., the document's associated bid is the second-highest bid.

FIG. 6 depicts another exemplary document according to an embodiment of the present invention. Here, the ad 1c comprises an ad for another movie and game called "Doom Wars."

FIGS. 4-6 may be displayed on the website 3 in the sequence shown, i.e., 1a followed by 1b and then 1c. The first ad 1a may be displayed first based on one or more preferences. For instance, it may be associated with the highest bid, highest click-through rate, and/or the least offensive content. It may also be associated with a preference for being displayed first. Even though the third ad 1c may have a slightly higher bid or click through rate, it may be displayed last based on a determination that the user who requested the ad may be a child and that "Doom Wars" is a violent movie and video game that may not be appropriate for children. However, in some embodiments, appropriateness factors may be ignored if the user is verified to be an adult. In such embodiments, for example, the ad "Doom Wars" may be displayed first in the sequence if it had the highest bid (or highest product of bid times click through rate, or the highest expected revenue generation for the advertiser or server, or other criteria).

Each document 1a-1c may be displayed for the same or a different amount of time. For example, the ads 1a-1c may be shown for five seconds each, and then the sequence may repeat. In some embodiments, a reverse, random, or other sequence may be implemented. Alternately, one or more documents may be displayed for different time durations. For instance, the ad for "Doom Wars" might be displayed longer than five seconds if it is associated with a specific preference for a longer display duration. For instance, the "Doom Wars" ad may comprise a video ad that shows a ten second video clip of the movie, and it therefore may have a preference for being shown ten seconds. In other embodiments, an ad such as "Doom Wars" may be displayed for a longer (or shorter) time based on a bid or other criteria.

In some embodiments, a new plurality of ads will be passed for display after documents 1a-1c have been displayed. These documents may also be displayed on a time-multiplexed basis.

The embodiments of the present inventions are not to be limited in scope by the specific embodiments described herein. For example, although many of the embodiments disclosed herein have been described with reference to advertisements and websites, the principles herein are equally applicable to the output of any content on a time-multiplexed basis, such as in an electronic or rotating billboard. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A method for time-multiplexing the display of a plurality of selected documents, comprising:

determining time-multiplexing criteria and space-multiplexing criteria for displaying a plurality of selected documents associated with a concept on a time-multiplexed basis, the time-multiplexing criteria and the space-multiplexing criteria based on at least one of a relevance of each of the selected documents to the concept, a cost per click, or a click through rate associated with each of the selected documents;

causing the display of the plurality of selected documents on a webpage at an output device according to the time-multiplexing criteria and the space-multiplexing criteria, wherein the time-multiplexing criteria determines a sequence of the selected documents and a time duration of display for each of the selected documents in the webpage, and wherein the space multiplexing criteria determines a location for display from among a plurality of locations for each of the selected documents in the webpage and a time duration of display for each of the selected documents at the respective locations in the webpage, wherein the causing the display of the plurality of selected documents includes:

causing the display of a first document in the webpage for a first time duration determined by either the time-multiplexing or space-multiplexing criteria, wherein the first document is displayed at a first location in the webpage along with content associated with the concept;

determining a lapse of the first time duration;
causing the display of a second different document replacing the first document in the webpage at the first location based on determining the lapse of the first time duration;
determining based on the space-multiplexing or time-multiplexing criteria if the first document should be displayed at a second different location in the webpage; and
causing either the display of the first document in the webpage at the second different location or retiring of the first document based on the determining if the first document should be displayed at the second different location in the webpage.

2. The method of claim 1, wherein the time-multiplexing criteria is also based on one or more preferences associated with the selected documents.

3. The method of claim 1, wherein the act of causing the display of the plurality of selected documents in the webpage at the output device according to the time-multiplexing criteria and space-multiplexing criteria comprises passing the webpage to the output device, wherein the webpage comprises code effective to implement the time-multiplexing criteria and the space-multiplexing criteria at the output device.

4. The method of claim 1, wherein the act of causing the display of the plurality of selected documents according to the time-multiplexing criteria and space-multiplexing criteria comprises:
generating at a server a file containing code effective to implement the time-multiplexing criteria and the space-multiplexing criteria; and
passing a link to the file.

5. The method of claim 1, wherein the act of causing the display of the plurality of selected documents according to the time-multiplexing criteria and space-multiplexing criteria comprises passing a parameterized object to the output device, the parameterized object referencing the plurality of selected documents and implementing the time-multiplexing criteria and space-multiplexing criteria.

6. The method of claim 1, wherein the act of causing the display of the plurality of selected documents according to the time-multiplexing criteria and space-multiplexing criteria comprises:
generating an animated file at a server comprising the plurality of selected documents;
passing the animated file to the output device.

7. The method of claim 6, further comprising:
receiving from an output terminal operatively connected to the output device timing information about a selection of one of the plurality of selected documents;
passing a parameterized object to the output device, the parameterized object referencing the plurality of selected documents and implementing the time-multiplexing criteria and the space-multiplexing criteria.

8. The method of claim 1, wherein the act of causing the display of the plurality of selected documents according to the time-multiplexing criteria and space-multiplexing criteria comprises passing the plurality of selected documents to the output device in the sequence.

9. The method of claim 1, further comprising:
passing to the output device code effective to cause a user computer to display the plurality of selected documents based on a timer at the user computer.

10. The method of claim 1, further comprising:
passing to the output device code effective to cause a user computer to request each of the plurality of selected documents from a server in the sequence according to the time-multiplexing criteria.

11. The method of claim 1, further comprising:
passing to the output device an animated image file configured to display each of the plurality of selected documents according to the time-multiplexing criteria.

12. The method of claim 1, wherein causing the display of a second different document replacing the first document in response to determining the lapse of the first time duration comprises:
causing the first document to fade out in the webpage, and further causing the second different document to fade in the webpage, after the first document fades out.

13. The method of claim 1, further comprising:
receiving a user selection of one of the plurality of selected documents;
providing to the user an electronic document associated with the user-selected document.

14. The method of claim 13, wherein the selected documents are advertisements, and wherein the electronic document is configured to be output as a webpage.

15. The method of claim 1, wherein the plurality of selected documents comprises a plurality of advertisements.

16. The method of claim 1, wherein the time-multiplexing criteria comprises instructions to display a specific one of the plurality of selected documents more than once.

17. The method of claim 1, wherein at least one of the plurality of selected documents is an advertisement.

18. The method of claim 1, wherein the plurality of selected documents comprises a plurality of banner ads.

19. The method of claim 1, further comprising:
receiving a request for a document associated with the concept, wherein the plurality of selected documents are selected based on a relevance to the concept.

20. The method of claim 19, wherein the concept comprises at least one or more keywords entered as a search request.

21. The method of claim 13, wherein the electronic document is output on an electronic billboard.

22. The method of claim 1, further comprising:
scaling one or more of the selected documents to a predetermined size or shape for display.

23. A system for time-multiplexing the display of a plurality of selected documents, comprising:
a processor that determines time-multiplexing criteria and space-multiplexing criteria for displaying a plurality of selected documents associated with a concept on a time-multiplexed basis, determines a lapse of a first time duration, and also determines based on the space-multiplexing or time-multiplexing criteria if the first document should be displayed at a second different location in the webpage, the time-multiplexing criteria and the space-multiplexing criteria based on at least one of a relevance of each of the selected documents to the concept, a cost per click or a click through rate associated with each of the selected documents; and
an output module that causes the display of the plurality of selected documents on a webpage at an output device according to the time-multiplexing criteria and the space-multiplexing criteria, wherein the time-multiplexing criteria determines a sequence of the selected documents and a time duration of display for each of the selected documents in the webpage, and wherein the space multiplexing criteria determines a location for display from among a plurality of locations for each of the selected documents in the webpage and a time duration of display for each of the selected documents at the respective locations in the webpage, wherein the output module causes the display of a first document in the webpage for the first time duration determined by either the time-multiplexing criteria or space-multiplexing criteria, wherein the first document is displayed at a first location in the webpage along with content associated with the concept, and wherein the output module causes the display of a second different document replacing the first document in the webpage at the first location based on determining the lapse of the first time duration, and causes either the display of the first document in the webpage at the second different location or retiring of the first document based on the determining if the first document should be displayed at a second different location in the webpage.

24. A method for providing a plurality of selected advertisements in a composite document, comprising:

receiving two or more advertisements;

receiving one or more bids and preferences associated with the advertisements;

associating each of the advertisements with one or more keywords;

receiving a request for a document related to a concept;

selecting the plurality of advertisements from the two or more advertisements based on a relevance of each of the plurality of advertisements to the concept;

determining time-multiplexing criteria and space-multiplexing criteria for displaying the plurality of selected advertisements on a time-multiplexed basis in a webpage, the time-multiplexing criteria and the space-multiplexing criteria being based on at least one of a relevance of each of the selected advertisements to the concept, a cost per click, or a click through rate associated with each of the selected advertisements;

in response to the request, causing the plurality of selected advertisements to be displayed according to the time-multiplexing criteria and the space-multiplexing criteria in a webpage at a user display device, wherein the time-multiplexing criteria determines a sequence of the selected documents and a time duration of display for each of the selected advertisements in the webpage, and wherein the space multiplexing criteria determines a location for display from among a plurality of locations for of each of the selected advertisements in the webpage and a time duration of display for each of the selected documents at the respective locations in the webpage, wherein the causing the plurality of selected advertisements to be displayed includes:

causing the display of a first advertisement in the webpage for a first time duration determined by either the time-multiplexing criteria or space-multiplexing criteria, wherein the first advertisement is displayed at a first location in the webpage along with content associated with the concept;

determining a lapse of the first time duration;

causing the display of a second different advertisement replacing the first advertisement in the webpage at the first location based on determining the lapse in the first time duration;

determining based on the space-multiplexing or time-multiplexing criteria if the first advertisement should be displayed at a second different location in the webpage; and causing either the display of the first advertisement in the webpage at the second different location or retiring of the first advertisement based on the determining if the first advertisement should be displayed at the second different location in the webpage.

25. The method of claim 1, wherein the second different document is displayed for a second time duration, the second time duration being different than the first time duration.

26. The method of claim 1, wherein the second different document is specified by the sequence determined by the time-multiplexing criteria.

27. A method for time-multiplexing the display of a plurality of selected documents, comprising:

determining space-multiplexing criteria for displaying a plurality of selected documents associated with a concept on a time-multiplexed basis, the space-multiplexing criteria based on at least one of a relevance of each of the selected documents to the concept, a cost per click, or a click through rate associated with each of the selected documents; and causing the display of the plurality of selected documents on a webpage at an output device according to the space-multiplexing criteria, wherein the space multiplexing criteria determines a location for display from among a plurality of locations for each of the selected documents at the output device in the webpage and a time duration of display for each of the selected documents at the respective locations in the webpage, wherein the causing the display of the plurality of selected documents includes:

causing the display of a first document in the webpage for a first time duration, wherein the first document is displayed at a first location in the webpage along with content associated with the concept;

determining a lapse of the first time duration; and determining based on the space-multiplexing criteria if the first document should be displayed at a second different location in the webpage; and causing either the display of the first document in the webpage at the second different location or retiring of the first document based on determining if the first document should be displayed at the second different location in the webpage.

* * * * *

UNITED STATES PATENT AND TRADEMARK OFFICE
CERTIFICATE OF CORRECTION

| | |
|---|---|
| PATENT NO. | : 7,725,502 B1 |
| APPLICATION NO. | : 11/152781 |
| DATED | : May 25, 2010 |
| INVENTOR(S) | : Gregory Joseph Badros, Jeff Eddings and Rama Ranganath |

It is certified that error appears in the above-identified patent and that said Letters Patent is hereby corrected as shown below:

In Claim 24, column 25, line 44 (approx.), delete "for of" and insert -- for --.

Signed and Sealed this

Fourteenth Day of December, 2010

David J. Kappos
*Director of the United States Patent and Trademark Office*